United States Patent
Kang et al.

(10) Patent No.: US 9,321,642 B2
(45) Date of Patent: Apr. 26, 2016

(54) METHOD FOR DECREASING SMR TUBE TEMPERATURE

(71) Applicant: L'Air Liquide Societe Anonyme Pour l'Etude et l'Exploitation des Procedes Georges Claude, Paris (FR)

(72) Inventors: Taekyu Kang, Newark, DE (US); Rong Fan, Hockessin, DE (US); Pavol Pranda, Hockessin, DE (US); Hwanho Kim, Newark, DE (US); Robert A. Gagliano, Cochranville, PA (US)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 8 days.

(21) Appl. No.: 14/096,293

(22) Filed: Dec. 4, 2013

(65) Prior Publication Data

US 2015/0151964 A1    Jun. 4, 2015

(51) Int. Cl.
*C01B 3/26* (2006.01)
*C01B 3/38* (2006.01)

(52) U.S. Cl.
CPC ............... *C01B 3/384* (2013.01); *C01B 3/382* (2013.01); *C01B 2203/0233* (2013.01); *C01B 2203/0877* (2013.01); *C01B 2203/1288* (2013.01); *C01B 2203/1614* (2013.01)

(58) Field of Classification Search
CPC ..................................................... C01B 3/382
USPC ........................................................ 423/652
See application file for complete search history.

(56) References Cited

U.S. PATENT DOCUMENTS

| | | | | |
|---|---|---|---|---|
| 4,019,684 | A * | 4/1977 | Parkin ........................... | 239/145 |
| 5,488,642 | A * | 1/1996 | Malik et al. .................... | 376/272 |
| 2004/0022724 | A1* | 2/2004 | Robb ............................. | 423/651 |
| 2005/0244329 | A1* | 11/2005 | Casanave et al. ............. | 423/651 |
| 2006/0042253 | A1* | 3/2006 | Fortuna et al. ................ | 60/740 |
| 2006/0147771 | A1* | 7/2006 | Russell et al. ................. | 429/24 |
| 2007/0284287 | A1* | 12/2007 | Freitag et al. ................. | 208/133 |
| 2010/0140552 | A1* | 6/2010 | Ammouri et al. ............. | 252/373 |
| 2010/0291451 | A1* | 11/2010 | Tamura et al. ................ | 429/429 |

* cited by examiner

*Primary Examiner* — Paul Wartalowicz
(74) *Attorney, Agent, or Firm* — Justin K. Murray

(57) ABSTRACT

A method for decreasing steam methane reformer (SMR) tube temperature is provided. The method can include the steps of introducing a hydrocarbon containing feed to be reformed to a plurality of SMR tubes in the presence of steam under conditions effective to produce hydrogen and carbon monoxide, monitoring the temperature of at least a plurality of the tubes within the SMR during operation, comparing the monitored temperature against a first predetermined value, and introducing an effective amount of water to a reformer tube when the monitored temperature of the reformer tube is at or above the predetermined value, such that the temperature of the reformer tube is reduced.

22 Claims, 4 Drawing Sheets

FIG. 2
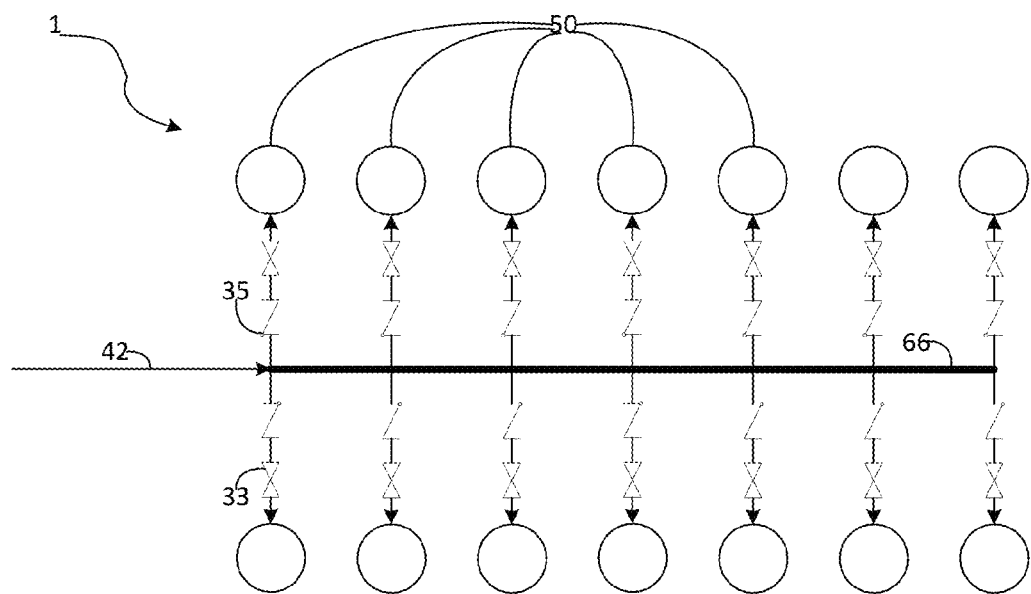
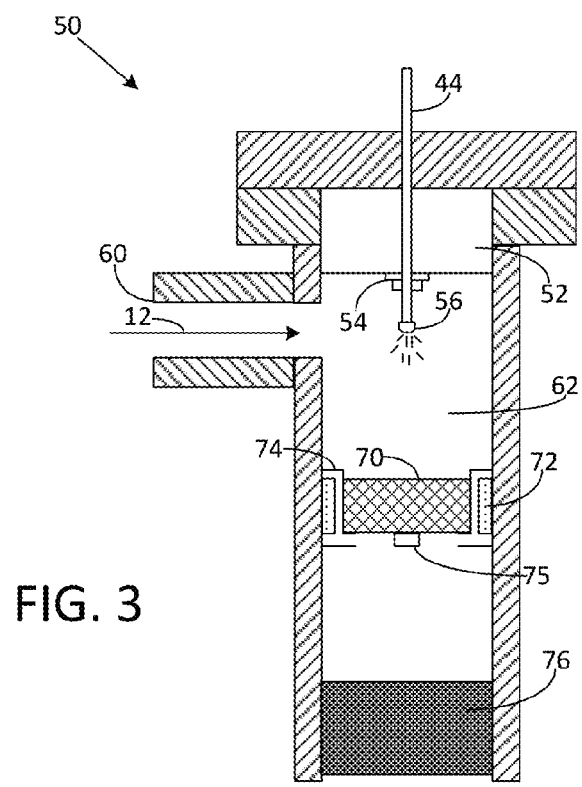
FIG. 3

METHOD FOR DECREASING SMR TUBE TEMPERATURE

TECHNICAL FIELD OF INVENTION

The present invention relates to a method for reducing the tube temperature of a steam methane reformer (SMR).

BACKGROUND

During normal operation of a steam methane reformer (SMR), some portion of the catalyst tubes may experience unexpectedly higher temperatures. Therefore, on account of the small number of tubes, the overall burner power has to be reduced and/or the steam to carbon ratio has to be increased to bring the temperature down; however, both of these methods globally affect plant efficiency. Additionally, predicting which tubes will be affected by this problem cannot be easily done since the tubes affected by this problem can vary. Therefore, a solution with which the temperature of each tube can be controlled independently has been sought to date, but no practical approach has been found.

SUMMARY

The present invention is directed to a method that satisfies at least one of these needs. The present invention is directed to a method that satisfies the need to reduce temperature of particular SMR tubes. Certain embodiments of the present invention relate to introducing water into an individual tube that is affected by abnormally high temperatures in order to reduce the temperature of the tube, such that the temperature is below a given threshold temperature. Embodiments of the invention allow the plant to run more efficiently because the burner and steam to carbon changes are not necessary.

In one embodiment, a method for decreasing the temperature of an SMR tube includes the following steps: introducing a hydrocarbon containing feed to be reformed to SMR tubes in the presence of steam under conditions effective to produce hydrogen and carbon monoxide, monitoring the temperature of at least a plurality of the tubes within the SMR during operation, comparing the monitored temperature against a first predetermined value, and introducing an effective amount of water to a reformer tube when the monitored temperature of the reformer tube is at or above the predetermined value, such that the temperature of the reformer tube is reduced Optional embodiments can also include:
  reducing, maintaining or stopping the introduction of water in step d) once the monitored temperature falls below a second predetermined value,
  wherein the amount of steam introduced to the SMR remains unaffected by the introduction of water,
  reducing the amount of steam introduced to the SMR when water is introduced. Preferably, the reduced amount of steam is approximately equal to the effective amount of water,
  wherein the water is introduced in sufficiently small droplet sizes to vaporize prior to contacting catalysts such that the pressure drop across the catalysts within the SMR tube is substantially unaffected,
  spraying the water using a hydraulic sprayer,
  atomizing the water in an atomizer such that the water is made up of water droplets of sufficiently small diameters to vaporize prior to contacting catalysts such that the water droplets do not adversely affect catalyst performance within the SMR tube,
  atomizing the water using a gas,
  atomizing the water using natural gas,
  atomizing the water in an atomizer such that the water is made up of water droplets, and then directing the water droplets through a foam, preferably a high surface area metallic or ceramic foam, to promote further vaporization of the water droplets, thereby reducing the risk of adversely affecting catalyst performance within the SMR tube,
  using a water tube in fluid communication with a demineralized water source and an atomizing nozzle to introduce the water, wherein the water tube has a delivery end disposed within the tube of the SMR at a point above catalysts, such that the water atomizes upon exiting the atomizing nozzle and entering the tube of the SMR,
  wherein the water, when introduced, consists essentially of water droplets having droplet sizes less than 500 microns and preferably 100 microns,
  wherein the first predetermined value is the maximum operating temperature rating of the tube, preferably 10° C. less than the maximum operating temperature rating of the tube,
  wherein the second predetermined value is the same as the first predetermined value, preferably 10° C. less than the first predetermined value, and
  wherein the water is demineralized water, preferably, originating from the same water source as steam used in the SMR, although any suitable source will work.

BRIEF DESCRIPTION OF THE FIGURES

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 2 illustrates a top view of an embodiment of the present invention.
FIG. 3 illustrates an embodiment of the present invention.

DESCRIPTION OF PREFERRED EMBODIMENTS

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Certain embodiments of the present invention provide a straightforward approach in that water, preferably demineralized, is introduced directly, preferably by injection, into a particular SMR tube in order to reduce the SMR tube temperature.

In one embodiment, water, preferably demineralized water can be introduced into a particular tube in order to reduce that tube's temperature. Demineralized water is typically available in the SMR plant to supply clean feedwater to the boilers for the steam production for the steam reforming process. In one embodiment, the water used for temperature regulation can be supplied directly from the plant's demineralized water source or from any returned condensate if the plant produces any excess steam that is not otherwise valorized. In a preferred embodiment, the water entering the SMR tube vaporizes prior to coming into contact with SMR tube catalysts.

Figure 1:
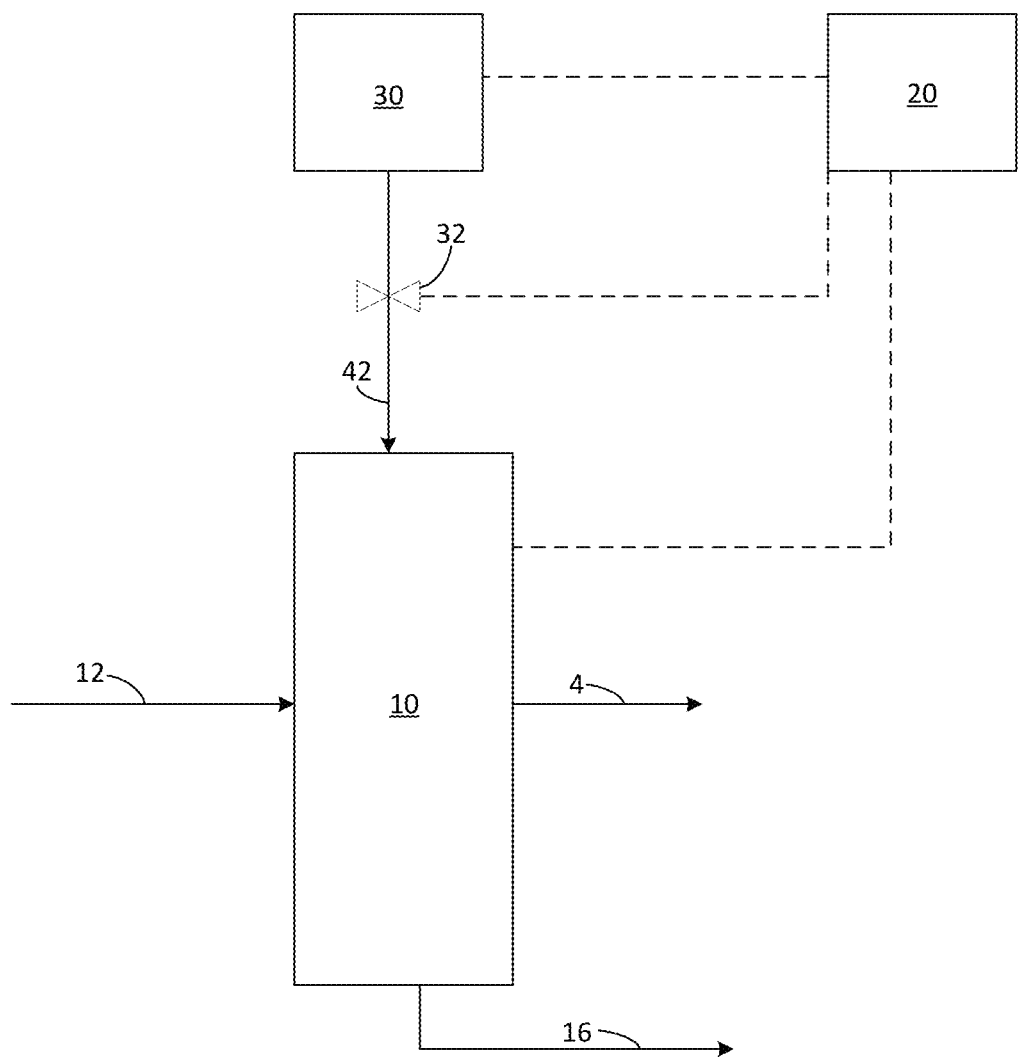
FIG. 1 illustrates an embodiment of the present invention.

FIG. 1 illustrates a general process overview of an embodiment of the invention. SMR furnace 10 receives hydrocarbon steam mixture 12 and produces syngas 4 and hot stream 16. As noted previously, some SMR tubes (not shown) within SMR furnace will exceed the desired operating temperature. In order to combat this issue, monitoring system 20 monitors the temperature of each SMR tube in order to identify any tubes that are running too hot. In the event an SMR tube is running hot, monitoring system can then initiate a sequence that will allow for water from water source 30 to be introduced to SMR tubes within SMR furnace 10. In the embodiment shown, monitoring system 20 communicates (e.g., wired or wireless communication) with water source 30 and/or valve 32 to allow for the flow of water 42. Monitoring system 20 continues to monitor the temperatures, and once the temperature of the affected SMR tube is below a desired value, monitoring system initiates a sequence to either stop the introduction of water to SMR furnace 10 or send a reduced amount of water that is effective for maintaining the tube's temperature below the desired value. It should be noted that use of a valve is not intended to limit the invention, as a person of ordinary skill in the art will recognize other methods of controlling flow of water can be utilized.

In another embodiment, rather than taking the temperature of all of the tubes, a smaller subset of temperatures can be taken, preferably, those areas of tubes that exhibit higher temperatures than normal.

In one embodiment, the flow rate of the incoming water 42 is determined by the upstream pressure. However, those of ordinary skill in the art will recognize that other methods for determining the flow rate can also be used, for example, flow meters.

FIG. 2 depicts a top view of a water distribution system 1. In the embodiment shown, header 66 carries water 42 to SMR tubes 50, which can be aligned in rows. In one embodiment, the flow rate at which the water is introduced to header 66 depends on the pressure of the system. Water 42 introduced to water distribution system 1 is usually readily available elsewhere in the plant operation. In one embodiment, each SMR tube 50 has its own valve 33 to control the flow of water to SMR tube 50. In one embodiment, check valves 35 can be installed to help improve the overall safety of the device. While FIG. 2 only shows two rows of SMR tubes 50, those of ordinary skill in the art will recognize that there can be more than two rows.

FIG. 3 provides a cross sectional view of SMR tube 50 in accordance with an embodiment of the invention. Hydrocarbon steam mixture 12 enters SMR tube 50 via feed inlet 60 before entering mixing zone 62. Hydrocarbon steam mixture 12 then travels down the length of SMR tube 50 coming into contact with catalyst 76, wherein the reforming reaction takes place. In the event SMR tube 50 exceeds a desired temperature, water 42, originating from water source 30, is introduced to mixing area 62 via water tube 44. In one embodiment, water tube 44 can vary in length. In an optional embodiment, SMR tube 50 can include a nozzle 56 that is configured to create small water droplets within mixing zone 62 to help improve water contact and speed up the cooling process. In one embodiment, insulation 52 can be utilized in top of SMR tube 50 to help reduce heat transfer through the top of SMR tube 50. Insulation holder 54 can also be included to provide support for insulation 52, and in certain embodiment, it can provide a seal from outside SMR tube 50.

In an optional embodiment, SMR tube 50 can also include foam 70, which helps to vaporize the water such that water droplets are prevented from making contact with catalyst 76. Advantageously, foam 70, in conjunction with operating conditions (e.g., temperature and pressure), provide sufficient surface area for evaporation of water droplets. In the embodiment shown, foam holder 74 provides support for foam 70, while ceramic fiber seal 72 provides a seal, such that substantially all of the water droplets are forced through foam 70. Orifice plate 75 can also be provided in order to control the pressure drop across foam 70. In one embodiment, foam 70 can be high surface area metallic foam or high surface area ceramic foam.

In one embodiment, nozzle 56 introduces water 42 before water 42 enters mixing area 62. Nozzle 56 may atomize water 42, which helps to further preserve the stability of SMR tube 50 by preventing liquid water droplets from harming catalyst performance in the lower part of SMR tube 50. The atomization process can make use of any acceptable gas, for example air or natural gas; however, use of natural gas is preferred since its use in the atomization process enables the steam and carbon ration to remain constant. In one embodiment, harm to the catalyst can be identified by a substantial pressure drop across SMR tube 50.

Figure 4:
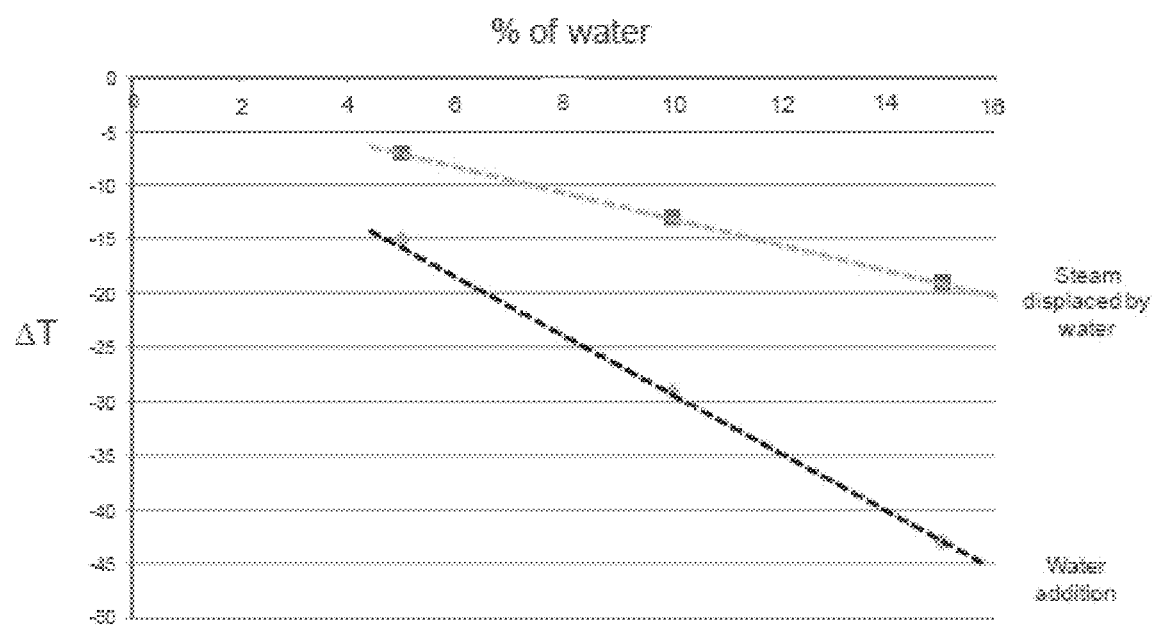
FIG. 4 illustrates comparative data for certain embodiments of the present invention.

FIG. 4 represents the impact of introducing a small amount of water to the high temperature SMR tube. As shown in FIG. 1, a relatively small amount of water (10-30 ml/s) can effectively reduce the tube temperature. In one embodiment, the water can be introduced by injection. Depending on the water injection methodology (i.e., additive or replacement), water can be added to the total flowrate (NG/steam+water) of a particular tube or water can displace a specific amount of steam at the inlet. As depicted in FIG. 4, the former method produces a greater temperature drop, which makes the addition of fluid to the total flow rate more effective in temperature reduction.

EXAMPLES

Figure 5:
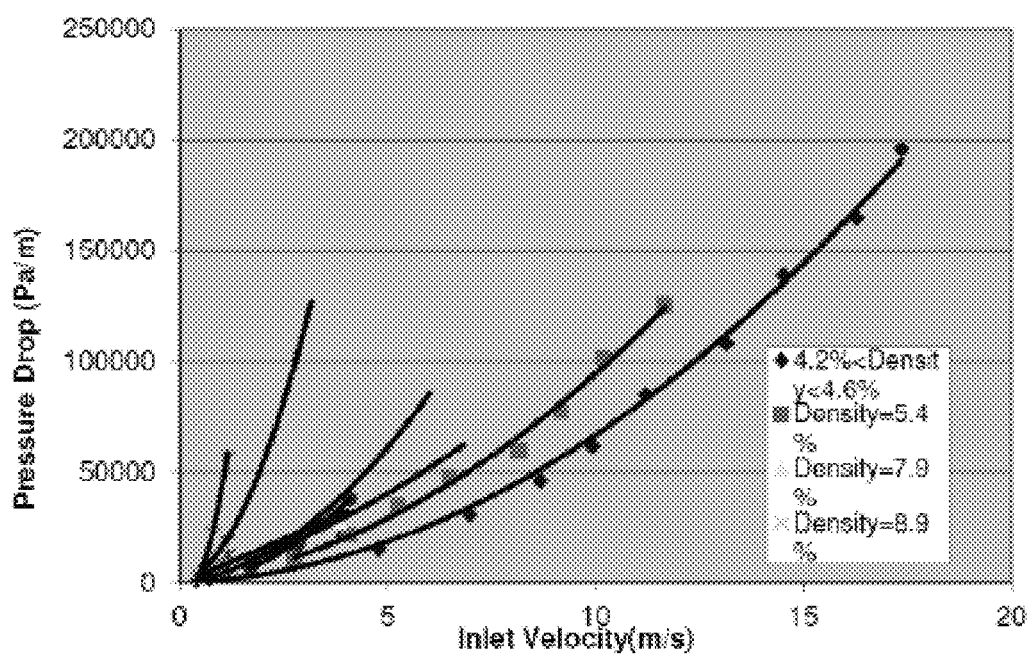
FIG. 5 illustrates increased pressure drop as a function of inlet velocity.

FIG. 5 is a graphical representation depicting pressure drop across various foams as a function of inlet velocity. As seen in FIG. 5, as inlet velocity is increased, the pressure drop across the foam also increases (this is shown by each individual line). Additionally, FIG. 5 shows that increasing the density of the foam increases the pressure drop across the foam.

Therefore, pressure drop is directly related to both foam density and inlet velocity. It is preferred to select a foam having a low pressure drop and while maintaining a high vaporization potential.

Table I includes collected data, which includes resulting droplet sizes as a function of various pressures and capacities for various spray pattern types. Based on the data in Table I, higher spraying pressures yields smaller droplet sizes, with lower flow rates (at the same pressures) having smaller droplet sizes. Additionally, hydraulic spraying yields droplet sizes that are generally higher than atomizers.

TABLE I

| | 10 psi (0.7 bar) | | | 40 psi (2.8 bar) | | | 100 psi (7 bar) | | |
|---|---|---|---|---|---|---|---|---|---|
| | Capacity | | VMD | Capacity | | VMD | Capacity | | VMD |
| Spray Pattern Type | gpm | lpm | microns | gpm | lpm | microns | gpm | lpm | microns |
| Air Atomizing | 0.005 | 0.02 | 20 | 0.008 | 0.03 | 15 | 12 | 45 | 400 |
| | 0.02 | 0.08 | 100 | 8 | 30 | 200 | — | — | — |
| Fine Spray | 0.22 | 0.83 | 375 | 0.03 | 0.1 | 110 | 0.05 | 0.2 | 110 |
| | — | — | — | 0.43 | 1.6 | 330 | 0.69 | 2.6 | 290 |
| Hollow Cone | 0.05 | 0.19 | 360 | 0.1 | 0.38 | 300 | 0.16 | 0.61 | 200 |
| | 12 | 45 | 3400 | 24 | 91 | 1900 | 38 | 144 | 1260 |
| Flat Fan | 0.05 | 0.19 | 260 | 0.1 | 0.38 | 220 | 0.16 | 0.61 | 190 |
| | 5 | 18.9 | 4300 | 10 | 38 | 2500 | 15.8 | 60 | 1400 |
| Full Cone | 0.1 | 0.38 | 1140 | 0.19 | 0.72 | 850 | 0.3 | 1.1 | 500 |
| | 12 | 45 | 4300 | 23 | 87 | 2800 | 35 | 132 | 1720 |

Droplet Size by Spray Pattern at Various Pressures and Capacities

The values in Table I are not intended to limit the invention to the pressure ranges or droplet sizes listed. Rather, the contents of Table I are provided for exemplary purposes.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for decreasing steam methane reformer (SMR) tube temperature within an SMR furnace having a plurality of reformer tubes (SMR tubes), the method comprising the steps of:
   a) introducing, via a reforming mixture inlet, a reforming mixture comprising steam and a hydrocarbon containing feed to each reformer tube under reforming conditions effective to produce hydrogen and carbon monoxide;
   b) monitoring the temperatures of at least a plurality of the SMR tubes during operation of the SMR furnace;
   c) comparing each of the monitored temperatures against a first predetermined value; and
   d) introducing, via a liquid water inlet, an effective amount of water to a selected reformer tube when the monitored temperature of the selected reformer tube is at or above the predetermined value, such that the temperature of the selected reformer tube is reduced independently of the remaining SMR tubes, wherein the water introduced in step d) is in liquid form upon introduction to the selected reformer tube.

2. The method as claimed in claim 1, further comprising the step of reducing the introduction of water in step d) once the monitored temperature of the selected reformer tube falls below a second predetermined value.

3. The method as claimed in claim 2, wherein the second predetermined value is the same as the first predetermined value.

4. The method as claimed in claim 2, wherein the second predetermined value is about 10° C. less than the first predetermined value.

5. The method as claimed in claim 1, further comprising the step of reducing the amount of steam present in the SMR tubes during step a) when water is introduced during step d).

6. The method as claimed in claim 5, wherein the reduced amount of steam is approximately equal to the effective amount of water introduced in step d).

7. The method as claimed in claim 1, wherein step d) further comprises atomizing the water in an atomizer such that the water is comprised of water droplets of sufficiently small diameters to vaporize prior to contacting catalysts, such that the water droplets do not adversely affect catalyst performance within the selected reformer tube, wherein the atomizer is located within the selected reformer tube.

8. The method as claimed in claim 7, wherein natural gas is used to atomize the water.

9. The method as claimed in claim 1, wherein step d) further comprises atomizing the water in an atomizer such that the water is comprised of water droplets, and then directing the water droplets through a foam to promote further vaporization of the water droplets, thereby reducing the risk of adversely affecting catalyst performance within the selected reformer tube, wherein the atomizer is located within the selected reformer tube, wherein the foam is located within the selected reformer tube.

10. The method as claimed in claim 9, wherein the foam is selected from the group consisting of metallic foam and ceramic foam.

11. The method as claimed in claim 1, wherein the amount of steam present in the SMR tubes during step a) remains unaffected by the introduction of water during step d).

12. The method as claimed in claim 1, wherein the water is introduced during step d) in sufficiently small droplet sizes to vaporize prior to contacting catalysts, such that the pressure drop across the catalysts within the selected reformer tube is substantially unaffected.

13. The method as claimed in claim 1, wherein step d) further comprises spraying the water using a hydraulic sprayer.

14. The method as claimed in claim 1, wherein the water is introduced using a water tube in fluid communication with a demineralized water source and an atomizing nozzle, wherein the water tube has a delivery end disposed within the selected reformer tube at a point above catalysts, such that the water atomizes upon exiting the atomizing nozzle and entering the selected reformer tube.

15. The method as claimed in claim 1, wherein the water introduced in step d) consists essentially of water droplets having droplet sizes less than 500 microns.

16. The method as claimed in claim 1, wherein the water introduced in step d) consists essentially of water droplets having droplet sizes less than 100 microns.

17. The method as claimed in claim 1, wherein the first predetermined value is the maximum operating temperature rating of the selected reformer tube.

18. The method as claimed in claim 1, wherein the first predetermined value is about 10° C. less than the maximum operating temperature rating of the selected reformer tube.

19. The method as claimed in claim 1, wherein the water is demineralized water.

20. The method as claimed in claim 1, wherein the water originates from the same water source as steam used in the SMR furnace.

21. The method as claimed in claim 1, wherein the liquid water inlet and the reforming mixture inlet are at two distinct locations, such that the water from step d) and the reforming mixture are not mixed prior to entering the selected reformer tube.

22. The method as claimed in claim 1, wherein the liquid water inlet and the reforming mixture inlet are located at two distinct locations within each individual reformer tube.

\* \* \* \* \*